United States Patent
Fiedler et al.

(10) Patent No.: US 10,408,378 B2
(45) Date of Patent: Sep. 10, 2019

(54) THREE-DIMENSIONAL MULTI-SHELL INSULATION

(71) Applicant: Raytheon Company, Waltham, MA (US)

(72) Inventors: Tracy M. Fiedler, El Segundo, CA (US); Kurt S. Ketola, El Segundo, CA (US); Andrew Truxel, Hermosa Beach, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 15/651,440

(22) Filed: Jul. 17, 2017

(65) Prior Publication Data

US 2019/0017645 A1   Jan. 17, 2019

(51) Int. Cl.
*F16L 59/02* (2006.01)
*B64G 1/58* (2006.01)
(Continued)

(52) U.S. Cl.
CPC ............. *F16L 59/029* (2013.01); *B33Y 80/00* (2014.12); *B64G 1/50* (2013.01); *B64G 1/58* (2013.01);
(Continued)

(58) Field of Classification Search
CPC ......... F16L 59/08; F16L 59/029; F16L 59/06; F16L 59/07; F16L 59/12; B64G 1/58; B64G 1/50
See application file for complete search history.

(56) References Cited

U.S. PATENT DOCUMENTS 1,444,397 A * 2/1923 Seigle .................. F16L 59/07
428/183
1,939,306 A * 12/1933 Leslie .................. E04B 1/7654
112/426

(Continued)

FOREIGN PATENT DOCUMENTS

DE   2657276   6/1978
EP   0155148   9/1985
(Continued)

OTHER PUBLICATIONS

FR-2948638-A1 MT (Year: 2011).*
(Continued)

*Primary Examiner* — Keith M Raymond
*Assistant Examiner* — Gordon A Jones
(74) *Attorney, Agent, or Firm* — Renner, Otto, Boisselle & Sklar, LLP (57) ABSTRACT

A three-dimensional multi-shell insulation configured to conform to the shape of a spacecraft component to be insulated. The insulation may have a plurality of nested shell layers that are displaceable relative to each other for providing natural separation between the shell layers when the insulation is used in low-pressure and/or low-gravity space-related applications. To establish the spacing between shell layers, an edge clamp may be operatively coupled to an edge portion on at least one side of each shell layer. The shell layers may have sufficient flexibility and/or may be sufficiently displaceable relative to each other to allow the insulation to be installed or removed from the spacecraft component. One or more restraints may be provided in the space between the shell layers for restricting the relative lateral and/or transverse movement between shell layers for preventing contact. Additive manufacturing may be employed to fabricate the insulation and integrate features.

16 Claims, 3 Drawing Sheets

(51) Int. Cl.
*B33Y 80/00* (2015.01)
*B64G 1/50* (2006.01)
*F16L 59/08* (2006.01)
*F16L 59/12* (2006.01)
*B33Y 10/00* (2015.01)
*B22F 3/105* (2006.01)
*B22F 7/06* (2006.01)
*F16L 59/16* (2006.01)

(52) U.S. Cl.
CPC ............ *B22F 3/1055* (2013.01); *B22F 7/06* (2013.01); *B33Y 10/00* (2014.12); *F16L 59/08* (2013.01); *F16L 59/12* (2013.01); *F16L 59/161* (2013.01)

(56) References Cited

U.S. PATENT DOCUMENTS

| | | | | |
|---|---|---|---|---|
| 1,987,798 | A * | 1/1935 | Ruppricht | F16L 59/07 261/112.2 |
| 2,142,542 | A * | 1/1939 | Wallach | F16L 59/07 138/115 |
| 3,152,033 | A * | 10/1964 | Black | F16L 59/065 250/515.1 |
| 3,354,021 | A * | 11/1967 | Royet | F17C 11/00 174/15.5 |
| 4,489,906 | A * | 12/1984 | Fellas | B29C 71/04 244/171.7 |
| 4,671,979 | A * | 6/1987 | Adiletta | F16L 59/026 428/74 |
| 5,271,980 | A * | 12/1993 | Bell | E04B 1/803 428/68 |
| 5,273,815 | A * | 12/1993 | Brydon | B64G 1/58 343/872 |
| 5,417,530 | A * | 5/1995 | Grossner | B64G 1/58 411/258 |
| 5,524,406 | A | 6/1996 | Ragland | |
| 5,547,628 | A * | 8/1996 | Lacombe | B64G 1/58 264/129 |
| 6,007,026 | A | 12/1999 | Shorey | |
| 6,131,646 | A * | 10/2000 | Kelley | B64G 1/50 165/185 |
| 6,485,805 | B1 | 11/2002 | Smith et al. | |
| 7,001,656 | B2 | 2/2006 | Maignan et al. | |
| 7,954,301 | B2 | 6/2011 | Mills | |
| 8,234,835 | B2 | 8/2012 | Dye et al. | |
| 8,257,809 | B2 * | 9/2012 | Morrison | B32B 18/00 428/161 |
| 8,453,393 | B2 | 6/2013 | Schroth et al. | |
| 8,662,448 | B2 * | 3/2014 | Weston | B64C 1/40 244/119 |
| 2005/0214067 | A1 | 9/2005 | Cherian | |
| 2010/0178457 | A1 * | 7/2010 | Pinney | B64G 1/58 428/137 |
| 2010/0252698 | A1 * | 10/2010 | Dye | F16L 59/065 248/177.1 |
| 2014/0255628 | A1 | 11/2014 | Fesmire | |
| 2015/0048209 | A1 | 2/2015 | Hoyt et al. | |
| 2015/0354907 | A1 * | 12/2015 | Herzberg | B64C 1/38 165/135 |

FOREIGN PATENT DOCUMENTS

| | | | |
|---|---|---|---|
| EP | 3015262 | 5/2016 | |
| FR | 2378576 A1 * | 8/1978 | ............ F16L 59/029 |
| FR | 2948638 A1 * | 2/2011 | ............ B32B 27/06 |
| GB | 474370 | 10/1937 | |
| GB | 2094947 A * | 9/1982 | ............ F16L 59/08 |
| JP | S5628495 | 3/1981 | |
| JP | H01237299 | 9/1989 | |
| SU | 1536156 A1 * | 1/1990 | ............ F16L 59/08 |
| WO | WO 8909860 A1 * | 10/1989 | ............ A47J 27/002 |
| WO | WO-9920461 A1 * | 4/1999 | ............ B32B 3/28 |
| WO | WO-2016027460 A1 * | 2/2016 | ............ B65D 90/06 |

OTHER PUBLICATIONS

SU-1536156-A1 (Year: 1990).*
FR-2378576-A1 MT (Year: 1978).*
WO 2016027460 A1 MT (Year: 2016).*
PCT/US2018/014842; PCT International Search Report and Written Opinion of the International Searching Authority dated Jul. 27, 2018.

* cited by examiner

THREE-DIMENSIONAL MULTI-SHELL INSULATION

TECHNICAL FIELD

The present disclosure relates generally to an insulation, and more particularly to insulation formed by three-dimensional nested shells, such as for use in space-related applications.

BACKGROUND

Insulation for spacecraft components helps to guard against the extreme conditions found in outer space, and to control thermal environments, for reliable operation of the spacecraft over long-durations. For example, because the exterior temperature of the spacecraft can vary by several hundred degrees depending on the spacecraft's exposure to solar radiation, such insulation may be used to thermally isolate the interior of the spacecraft or specific components to minimize thermal cycling. Multi-layer insulation (MLI) is considered the standard means for providing a thermal barrier for spacecraft components, and has been used in space-related applications for more than 50 years. MLI is typically composed of multiple flat layers of metallized Mylar or Kapton film, with a thin netting of an insulating polymer material, such as Dacron or Nomex, placed in between each film layer to minimize contact, and thus reduce thermal conduction between layers. However, the performance of MLI is strongly dependent on the manner in which it is formed and thereafter attached to the spacecraft, because areas where the MLI overlaps to produce folds, or areas having seams or penetrations, may dramatically reduce insulative performance. Because MLI's performance is so dependent on how well the individual flat panels fit together to form a covering that is free from compressive forces, the MLI blanket panels must be designed and sewn together in a custom manner, which is a time-consuming and expensive process. Moreover, MLI's insulative performance is difficult to predict due to its dependence on fit and the negative impact of seams or folds, which introduce unwanted conductive heat paths. Increasing the number of layers is a typical technique to compensate for this unpredictability.

SUMMARY

The present disclosure provides a three-dimensional multi-shell insulation that is configured to conform to the shape of a spacecraft component to be insulated, which helps to minimize the number of seams or compressive folds between layers, thereby reducing thermal leakage and thermal conduction resulting in improved insulative performance.

More particularly, the multi-shell insulation has a plurality of nested shell layers of increasing size that are displaceable relative to each other such that a natural separation between the shell layers forms when the insulation is used in low-pressure and/or low-gravity environments, such as outer space. To establish and maintain the spacing between shell layers, at least one edge clamp may be operatively coupled to at least one edge portion of each of the shell layers.

The nested shell layers may have sufficient flexibility and/or may be sufficiently displaceable relative to each other to allow the insulation to be installed around bends or corners of the spacecraft component and to allow temporary deformation during handling. The insulation also may be removable to enhance access to the spacecraft component.

Because the shell layers may be able to shift relative to each other, one or more restraints may be provided in the space between the shell layers to help restrict relative movement and minimize contact between shell layers so as to maintain insulative performance.

For example, the restraints may be abutments that act as stops for restricting too much lateral movement between the shell layers, such as when an external lateral force is applied. The abutments also may act as stops for preventing the shell layers from intimate contact along a substantial portion of each layer, such as when an external compressive force is applied. In some embodiments, the abutments of each shell layer may be free from connection to an adjacent shell layer to allow more freedom of movement between the shell layers, thereby enabling the natural separation between shell layers, minimizing contact between layers, and enhancing flexibility of the three-dimensional multi-shell insulation.

In some embodiments, the individual shell layers may be formed with a polymeric material that provides sufficient flexibility for installation and removal. The polymeric material also may provide low thermal conductivity. In addition, the individual shell layers may be metallized, such as with an aluminum, gold, or other metal coating, to provide a low emissivity that further enhances insulative performance.

In some embodiments, the insulation may be coupled to the spacecraft component via the at least one edge clamp, which may have a fastening mechanism integrated therein. The edge clamp also may have a grounding wire integrated therein for reducing weight and ensuring grounding contact. The edge clamp also may be formed of a low thermal conductivity material for enhancing insulative performance.

In some embodiments, the at least one edge clamp may include at least two edge clamps laterally spaced part along the at least one side of the shell layer to provide at least one passage, or vent, which is in fluid communication with the space between shell layers so as to allow gases to escape during decompression.

In some embodiments, the three-dimensional shell layers may be additively manufactured to allow the insulation to conform to the shape of a spacecraft component to be insulated.

Such configuration(s) of the three-dimensional multi-shell insulation having customized shells that conform to the shape of the spacecraft component, and which minimize contact between the nested shell layers, may reduce the number of shell layers that are needed for providing comparable insulative performance to known insulations, such as multi-layer insulation (MLI), but while also providing reduced mass and improved cost.

Such configuration(s) may provide precise individual sizing of each successively nested shell layer to reduce or eliminate compression of the layers at bends or folds. In addition, the custom-shaped features may reduce heat leakage by reducing the number of penetrations, such as by providing seams only where desired for facilitating installation and/or removal.

Such configuration(s) utilizing the edge clamp to hold the shell layers together, while also spacing them apart and allowing natural separation between layer major portions, may minimize the compressive contact between the shell layers, which may improve insulative performance compared to known MLI. In addition, utilizing the edge clamp to hold the shell layers together also may negate sewing multiple seams or edges as compared to known MLI, which may reduce contamination and foreign object debris.

Generally, the three-dimensional multi-shell insulation may utilize a plurality of nested shells to space reflective insulative layers within a custom designed flexible spacecraft insulation that is installable and removable.

According to one aspect of the present disclosure, a three-dimensional multi-shell insulation for insulating at least a portion of a spacecraft is provided that includes: a plurality of nested shell layers configured to at least partially surround the at least one portion of the spacecraft, each of the plurality of shell layers having layer edge portions on opposite sides of the shell layer, and a layer major portion extending between the layer edge portions; and at least one edge clamp operatively coupled to the plurality of shell layers at the respective layer edge portions on at least one side of the shell layers; wherein the layer major portions of the plurality of shell layers have at least one layer major surface configured to be spaced apart from an opposing major surface of an adjacent shell layer for minimizing thermal conduction between the shell layers; and wherein the at least one edge clamp is configured to establish or maintain spacing between the respective layer major surfaces of the shell layers when the insulation is in use in a low-gravity and/or low-pressure environment.

According to another aspect of the present disclosure, a three-dimensional multi-shell insulation may be formed by additive manufacturing techniques to provide an integrated and unitary insulation providing significant labor and time savings.

More particularly, according to an aspect of the present disclosure, an additively manufactured three-dimensional multi-shell insulation for insulating at least one portion of a spacecraft comprises: a plurality of nested shell layers formed as a unitary insulation member that is configured to at least partially surround the at least one portion of the spacecraft; each of the plurality of shell layers having layer edge portions on opposite sides of the shell layer, and a layer major portion extending between the layer edge portions; the layer major portions of the plurality of shell layers having at least one layer major surface configured to be spaced apart from an opposing layer major surface of an adjacent shell layer for minimizing thermal conduction between the shell layers; and the layer major portions of adjacent shell layers among the plurality of shell layers each having at least one restraint that is integrally formed and unitary with the shell layers; wherein the respective restraints of the adjacent shell layers are configured to allow the adjacent shell layers to be displaceable relative to each other up to a prescribed amount, and to restrict the relative displacement between the adjacent shell layers beyond the prescribed amount.

In some embodiments, the additively manufactured three-dimensional multi-shell insulation may include an edge binding that is integrally formed and unitary with the plurality of shell layers at the respective layer edge portions on at least one side of the shell layers, wherein the edge binding is configured to establish spacing between the respective layer major surfaces of adjacent shell layers.

For example, the edge binding may be configured to space the layer major surfaces of adjacent shell layers by a sufficient amount to enable electroless plating of the shell layers after the insulation has been additively manufactured.

In some embodiments, the spacing provided by the edge binding may define at least one flow passage that is in fluid communication with the space between shell layers so as to allow gases to escape from between layers. Optionally, the flow passage(s) may include filter(s) configured to filter foreign object debris.

In some embodiments, each of the respective restraints may be configured as a tether, such as a ribbon of material attached between the adjacent layers. In this manner, as the restraints may be connected between layers, the resulting thermal conductivity may be managed with the use of low thermal conductivity shell material and longer conductive length by virtue of wider separation between layers. Although this may result in a thicker insulation, the resultant structure may be less dense.

Such an additively manufactured three-dimensional multi-shell insulation may be formed directly from a digital model for achieving a higher precision of lay-up that optimizes the repeatability and predictability, which otherwise might not be achievable by assembling individual layers.

In some embodiments, the additively manufactured three-dimensional multi-shell insulation may incorporate functions for attachment, grounding, and venting that eliminates the need for separate edge clamps. Grounding paths may be provided by inserting sufficient copper wiring through the assembly. To minimize the thermal conductive leaks through the grounding feature, a circuitous path may be used to lengthen the thermal conductive path while maintaining electrical conductivity.

The following description and the annexed drawings set forth certain illustrative embodiments according to the present disclosure. These embodiments are indicative, however, of but a few of the various ways in which the principles according to the present disclosure may be employed. Other objects, advantages and novel features according to aspects of the disclosure will become apparent from the following detailed description when considered in conjunction with the drawings.

BRIEF DESCRIPTION OF THE DRAWINGS

The annexed drawings, which are not necessarily to scale, show various aspects according to the present disclosure.

DETAILED DESCRIPTION

The principles and aspects according to the present disclosure have particular application to insulation used for insulating spacecraft components in space-related applications, and thus will be described below chiefly in this context. It also understood, however, that the principles according to the present disclosure may be applicable to insulation for other applications, such as earth-based cryogenic applications, or the like, where it is desirable to provide a three-dimensional multi-shell insulation that generally conforms to the shape of the object to be insulated, while minimizing thermal leakage and thermal conduction to improve insulative performance.

Figure 1A:
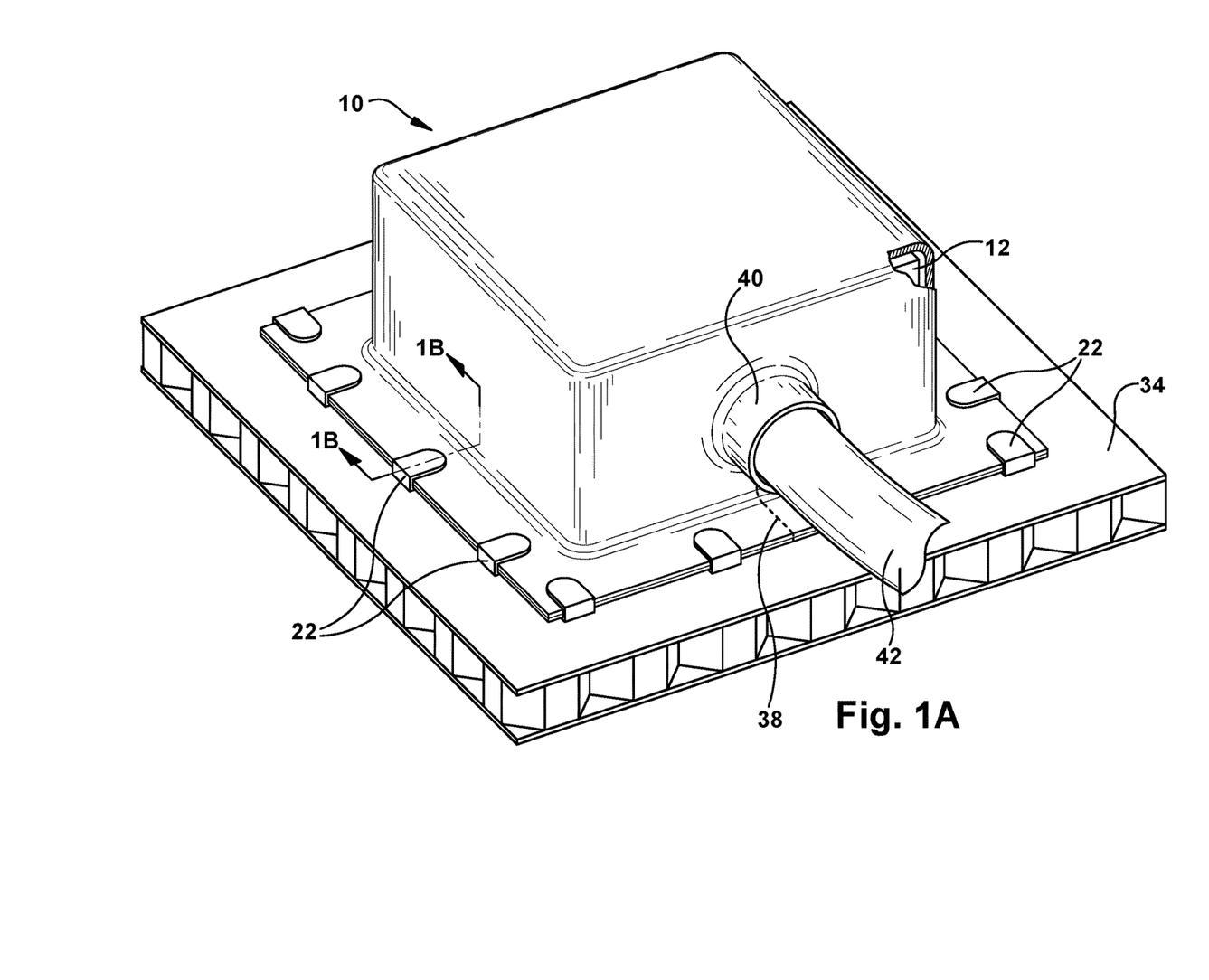
FIG. 1A is a perspective view of an exemplary three-dimensional multi-shell insulation according to an embodiment of the present disclosure, which is shown insulating an exemplary spacecraft component.
Figure 1B:
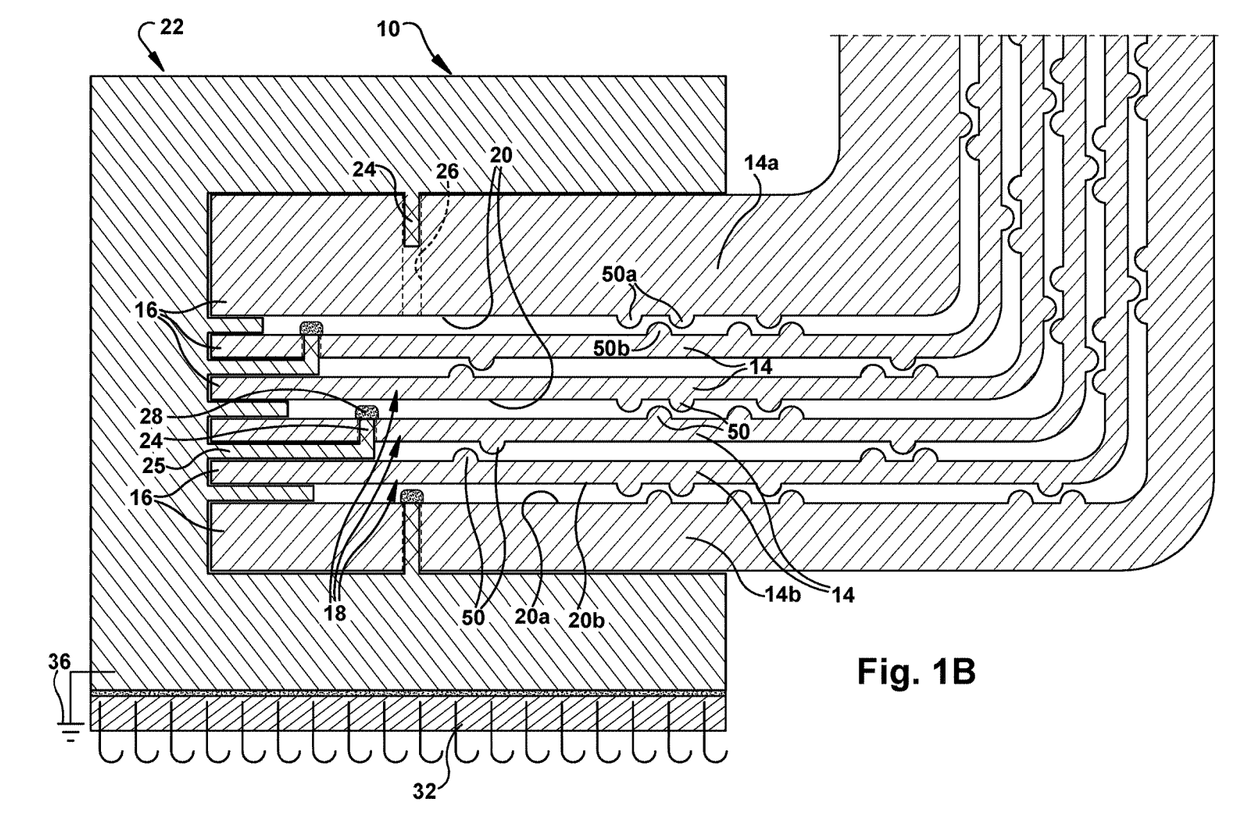
FIG. 1B is a cross-sectional side view of a portion of the three-dimensional multi-shell insulation in FIG. 1A taken about the line 1B-1B.

FIGS. 1A and 1B show an exemplary three-dimensional multi-shell insulation 10 for insulating at least a portion of a spacecraft, or spacecraft component 12. As shown, the three-dimensional multi-shell insulation 10 (also referred to herein as "insulation" or "3DMSI") may be configured to conform to the shape of the spacecraft component 12, and thus may have one or more bends, corners, or other such three-dimensional configurations in which the insulation 10 extends along at least three-axes.

As shown in the illustrated embodiment, the insulation 10 includes a plurality of nested shell layers 14 that may progressively increase in size around at least a portion of the spacecraft component 12. For example, the insulation 10 may have at least one outer shell layer 14a and at least one inner shell layer 14b, and may have one or more shell layers 14 therebetween. The shell layers 14 may each have edge portions 16 on opposite sides of each shell layer 14, with layer major portions 18 extending between the respective layer edge portions 16. The layer major portions 18 may have at least one layer major surface 20 (e.g., 20a) configured to be spaced apart from an opposing layer major surface (e.g., 20b) of an adjacent shell layer for minimizing thermal conduction between the shell layers. In exemplary embodiments, the layer major portions 18 of each nested shell layer 14 may be displaceable relative to each other for allowing the insulation to billow outwardly such that a natural separation forms between the layer major surfaces 20 when the insulation 10 is used in low-pressure (e.g., $1\times10^{-6}$ to $<1\times10^{-17}$ Torr) and/or low gravity (e.g., $10^{-2}$ g) environments, such as when used in space-related applications.

As shown, at least one edge clamp 22 is provided to operatively couple to the edge portion 16 on at least one side of each of the shell layers 14 so as to set and/or maintain a gap between the shell layers 14 (as shown in FIG. 1B, for example). The edge clamp 22 may be operatively coupled to one or more of the shell layers 14 by any suitable means. For example, as shown in the illustrated embodiment, the edge clamp 22 may have one or more posts 24 that are slidably disposed in one or more holes 26 in the shell layers 14. As shown, the posts 24 may extend transversely from one or more spacer brackets 25, which may be provided for facilitating spacing between layers 14. The holes 26 in the shell layers may be through-holes, and the posts 24 may extend transversely from one side of the shell layer to an opposite side. A fastening mechanism 28, such as a suitable bonding agent or adhesive, may be utilized to fixedly attach the edge clamp 22 to the shell layers 14. In exemplary embodiments, the fastening mechanism 28, such as the bonding agent, may be removable so that the edge clamp 22 also may be removable. In some embodiments, the edge clamp 22 may include one or more segments, or the edge clamp may be unitary. It is understood that as used herein, the term "edge clamp" refers to any suitable structure configured to establish and/or maintain the spacing between the shell layers 14. Thus, although shown as a c-shaped clamp that encloses the edge portions 16 of the shell layers, the edge clamp may include other forms of bindings, braces, clasps or other suitable mechanisms for holding the individual shell layers 14 together.

The insulation 10 may include more than one edge clamp 22, such as multiple edge clamps 22 on one side of the shell layers 14, or one or more edge clamps 22 on each side of the shell layers 14 (as shown in FIG. 1A, for example). In exemplary embodiments, at least two of the edge clamps 22 may be laterally spaced apart along one or more sides of the shell layers 14 to provide at least one fluid passage, or vent, in fluid communication with one or more of the gaps between the adjacent shell layers 14. For example, as shown in the illustrated embodiment, the venting of gases may flow around the edge clamps 22 and out of the sections of the insulation that are not covered by the clamps 22. Alternatively or additionally, the edge clamps 22 may have one or more passages extending through the clamp to allow venting of fluid, such as gases, from between the shell layers 14. Such configuration(s) may allow decompression gases to escape from between the layers 14, which may occur during the transition from atmospheric pressures (e.g., earth's atmosphere, such as 760 Torr) to low-pressures (e.g., outer space, such as $1\times10^{-6}$ Torr or less). Optionally, at least one filter may be included in the fluid passage(s) for filtering foreign object debris.

In exemplary embodiments, the edge clamp 22 may include at least one fastener 32 for operatively coupling the insulation 10 to the another portion of the spacecraft, such as a panel component 34. For example, in the illustrated embodiment, the fastener 32 is configured as a removable-type fastener, such as a hook-and-loop fastener, for example Velcro®, which may have one portion of the fastener 32 attached to the edge clamp 22 and the other portion attached to the panel component 34. Such a configuration may facilitate installation and removal of the insulation 10. In exemplary embodiments, the edge clamp 22 also may have a grounding wire 36 integrated into the edge clamp for providing electrical grounding with the spacecraft component 12 and/or the panel component 34. The edge clamp 22 may be formed of a low thermal conductivity material (e.g., have the same or lower thermal conductivity than the shell layers 14) for enhancing insulative performance. The grounding wire 36 may be provided by inserting sufficient conductive wiring, such as copper wire, through the edge clamp. To minimize the thermal conductive leaks through the grounding feature, a circuitous path may be used to lengthen the thermal conductive path while maintaining electrical conductivity.

In exemplary embodiments, the insulation 10 is configured to conform to the shape of the spacecraft component 12, and also is sufficiently flexible to enable installation on and/or removal from the spacecraft component 12, such that the insulation 10 may bend or wrap to at least partially surround the spacecraft component 12. To facilitate installation or removal, the nested shell layers 14 may have sufficient flexibility to enable the layer edge portions 16 on opposite sides of the shell layers (e.g., 16a, 16b) to be movable relative to each other. This may allow the insulation 10 to be installed and at least partially surround the spacecraft component 12 for insulative purposes, and also may allow the insulation 10 to be removed for enhancing access to spacecraft component 12. In addition, the ability to conform to the spacecraft component 12 and/or be flexible may enable the insulation 10 to provide one or more insulation cowls 40 for insulating communications channels, conduits (e.g., 42), or other connection assemblies, such as for electrical cables, tanks, plumbing, or the like. Such flexibility and/or the ability to be installed to surround the spacecraft component 12 also may reduce the number of seams or gaps provided by the insulation 10, which may reduce thermal leakage and enhance insulative performance. For example, as shown in the illustrated embodiment, the shell layers 14 are configured to at least partially surround the spacecraft component 12 such that opposite edge portions of the shell layers may be juxtaposed to provide a single seam 38. It is understood, however, that more than one seam may be provided by the edge portions of the shell layers, which may depend on the complexity of the spacecraft component and the desirability to install and/or remove the insulation 10, as understood by those having skill in the art.

In exemplary embodiments, it also may be beneficial to provide a weave within individual shell layers to provide more flexibility at a certain location (e.g., for bends at a significant angle, such as 90 degrees). In this manner, the shell layer can be weaved into a lattice similar to forming cloth material. Each individual layer could be woven, which would provide more elasticity at the location than a solid thin film.

Because the shell layers 14 may be displaceable relative to each other, an external force could urge the shell layers 14 toward each other to cause contact. For example, an external lateral force could urge the shell layers 14 to shift laterally, such that as those layers extend around corners or bends the layers could contact each other. Similarly, an external compressive force could urge the shell layers 14 toward each other in the perpendicular direction such that the shell layers 14 could contact each other. Such intimate contact could increase thermal conduction paths and reduce the insulative performance of the insulation 10. Therefore, to restrict the amount of lateral and/or transverse displacement between the shell layers 14, one or more restraints may be provided in the gaps between the shell layers 14.

As shown in the illustrated embodiment, the one or more restraints may include one or more abutments 50 that act as stops to restrict contact between layers 14. As shown, layer major portions 18 may include the one or more abutments 50, which may protrude from the layer major surfaces 20 to extend into the space between the shell layers 14. As shown, the abutments 50 may be configured to provide a stop when they engage the opposing layer major surface 20, which prevents the opposing layer major surfaces 20 of adjacent shell layers 14 from contacting each other. As such, the abutments 50 may have rounded, pointed, or narrowed ends so as to minimize their contact with the opposing surface. The abutments 50 of adjacent shell layers 14 also may be configured to provide a stop when they engage each other for restricting the amount of relative lateral movement between layers 14. As such, in exemplary embodiments, the abutments 50 of one shell layer may be laterally offset from the abutments 50 of the opposing shell layer. In the illustrated embodiment, the abutments 50 of adjacent shell layers 14 may be configured in a pin-socket like arrangement to restrict shifting in either direction. For example, two or more abutments (e.g., 50*a*) on one shell layer 14 may straddle one or more abutments (e.g., 50*b*) on an adjacent shell layer to restrict the amount of side-to-side shifting. It is understood that although these abutments 50 are shown on at least one side of each shell layer 14, some layers 14 may be devoid of abutments.

As shown in the illustrated embodiment, the one or more abutments 50 of each shell layer 14 are not connected across the gap to an adjacent shell layer. This may reduce the amount of contact between layers, and may facilitate the ability of the layer major portions 18 to float relative to each other, which may further enhance flexibility and further enable natural separation between layers, thus improving insulative performance. Because the layer major portions 18 may not be connected via the abutments 50, the edge clamp 22 is configured to maintain spacing between layers 14. In other words, the insulation 10 preferably is not load bearing, and so the precise shaping of the nested shell layers 14 to avoid layer-to-layer contact while conforming to the spacecraft component 12, and while also providing natural separation between layers, allows the layer major surfaces 18 to be devoid of connectors or other such structures that would permanently connect together and/or force apart the layer major portions 18 of adjacent layers. Such connectors or other such structures could increase rigidity, increase thermal conduction and reduce insulative performance of the insulation. Rather, in exemplary embodiments of the insulation 10, the abutments 50 preferably do not always contact each other or other portions of the adjacent shell layer, but instead are provided as stops to minimize contact only when the shell layers 14 are shifted, such as when an external force is applied. Accordingly, in exemplary embodiments, the one or more edge clamps 22 may be provided as the only mechanism for coupling the plurality of shell layers 14 together. It is understood, however, that in other embodiments, one or more structures or restraints, such as a tether, may be employed between layers to help connect layer major portions together, while still providing a sufficient amount of displacement between the layer major portions.

In the illustrated embodiment, the one or more abutments 50 of each shell layer 14 are integrally formed with the shell layer 14, in which case the abutments 50 may be made of the same material as the shell layer 14. Alternatively or additionally, the one or more abutments 50 may be attached to each shell layer 14, in which case the abutments 50 may be made of the same or different material than the shell layer. In exemplary embodiments, the abutments 50 may be formed with a material having the same or lower thermal conductivity than the material that forms the shell layer 14. For example, the thermal conductivity of the shell layers 14 may be less than 0.3 W/m K and preferably less than 0.15 W/m K, and the thermal conductivity of the abutments 50 may be less than 0.1 W/m K and preferably less than 0.05 W/m K. In exemplary embodiments, the abutments 50 may be made of an aerogel material, such as a polyimide aerogel, which may have a thermal conductivity of about 0.03-0.1 W/m K and preferably less than 0.03 W/m K. The transverse thickness of one or more of the abutments 50 may be in the range from about 0.01 mm to about 0.05 mm, more particularly about 0.02 mm.

In exemplary embodiments, one or more of the shell layers 14 may be made of a polymeric material, such as a cyanate ester, epoxy, polyurethane, polyimide, acrylic-based photopolymer (UV cured), or other UV cured polymers. Alternatively or additionally, one or more of the shell layers 14 may be made of metal, such as aluminum or nickel-cobalt. In exemplary embodiments, the polymeric shell material may have low outgassing, such as having a total mass loss (TML) of less than 1.0% and a volatile condensable materials (VCM) of less than 0.1%. Optionally, the polymer outgassing may be mitigated by vacuum bake out and/or metallization encapsulation. In exemplary embodiments, the transverse thickness of one or more of the shell layers 14 may be less than 0.25 mm, more particularly less than 0.13 mm, and more particularly less than 0.08 mm. In the illustrated embodiment, the outer shell layer 14*a* and the inner shell layer 14*b* may be thicker than the other shell layers between these two layers (14*a*, 14*b*). For example, the outer shell layer 14*a* may be about 0.13 mm thick, the inner shell layer 14*b* may be about 0.08 mm thick, and one or more of the shell layers 14 therebetween may each be about 0.03 mm thick. Accordingly, the overall transverse thickness of the illustrated six-layer insulation 10, including separations between layers, may be about 0.43 mm thick.

In exemplary embodiments, one or more of the shell layers 14 may be metallized with a thin coating, such as an aluminum, nickel, gold, or other suitable metal coating, to reduce emissivity. For example, the emissivity of one or more of the shell layers 14 may be in the range from about 0.02-0.2, and more particularly less than 0.05. In exemplary embodiments, the low-emissivity coating may be applied to one or both sides of the shell layers 14, including the layer major surfaces 20 and/or the abutments 50, although the abutments 50 may be devoid of such low-emissivity coating to minimize thermal conduction. In the illustrated embodiment, the outer shell layer 14a may have only the inner side coated, whereas the remaining layers 14 and 14b may have both sides coated. The coating may be applied by any suitable method, such as electroless plating, atomic layer deposition, or vacuum deposition techniques, as understood by those having skill in the art.

In exemplary embodiments, the individual shell layers 14 may be additively manufactured to facilitate close conformance to the shape of the spacecraft component 12. Any suitable additive manufacturing technique may be employed according to well-known methods understood by those having skill in the art. For example, such additive manufacturing methods may include: vat photopolymerization techniques (e.g., stereolithography (SLA), direct light processing (DLP), continuous liquid interface production (CLIP)); powderbed fusion techniques (e.g., selective layer sintering (SLS), selective laser melting (SLM/DMLS), electron beam melting (EBM), multijet fusion (MJF)); material extrusion techniques (e.g., fused deposition modeling (FDM)); material jetting techniques; binder jetting techniques; direct energy deposition techniques (e.g., laser engineered net shape (LENS), electron beam additive manufacturing (EBAM); or any other suitable techniques (e.g., ultrasonic additive manufacturing, etc.).

In accordance with such additive manufacturing methods, an exemplary process for fabricating the insulation 10 may include: i) determining the spacecraft component to be insulated, ii) mapping the configuration and/or shape of the spacecraft component into three-dimensional coordinate space, iii) based upon the three-dimensional mapping, providing a three-dimensional model of each shell layer 14 individually, or a three-dimensional model of the insulation 10 as a whole, and iv) based upon the three-dimensional model, additively manufacturing each shell layer 14 individually, or one or more of the shell layers together, which also may include additively manufacturing the abutments or other structural features with the shell layers.

In exemplary embodiments, the three-dimensional model for the shell layers 14, or the insulation 10 as a whole, may be defined in any suitable manner, for example, any computer-readable file or files on a non-transitory computer readable medium that collectively specify the shape, structure, materials, etc. of the insulation. The model may include CAD files, STL files, or the like that provide three-dimensional descriptions of the object. For example, the model may include a computer aided design and manufacturing (CAD/CAM) model having three-dimensional numeric coordinates of the entire configuration of the insulation 10, or each shell layer 14, including both external and internal surfaces, as well as any internal cavities and openings. Fabrication instructions corresponding to the model may be any collection of instructions that, when carried out by the additive manufacturing apparatus, result in the fabrication of the individual shell layers 14 or the insulation 10. For example, fabrication instructions may include a series of instructions for moving to various x,y,z coordinates, extruding or forming the build material, controlling feed rates, etc.

After the individual shell layers 14 have been formed, whether via additive manufacturing or other process, the exemplary assembly process may further include the steps of: i) metallizing shell layers as desired, ii) optionally attaching one or more abutments to desired shell layers, and iii) nesting and assembling the shell layers, including attachment of the one or more edge clamps, to produce the three-dimensional multi-shell insulation.

Figure 2:
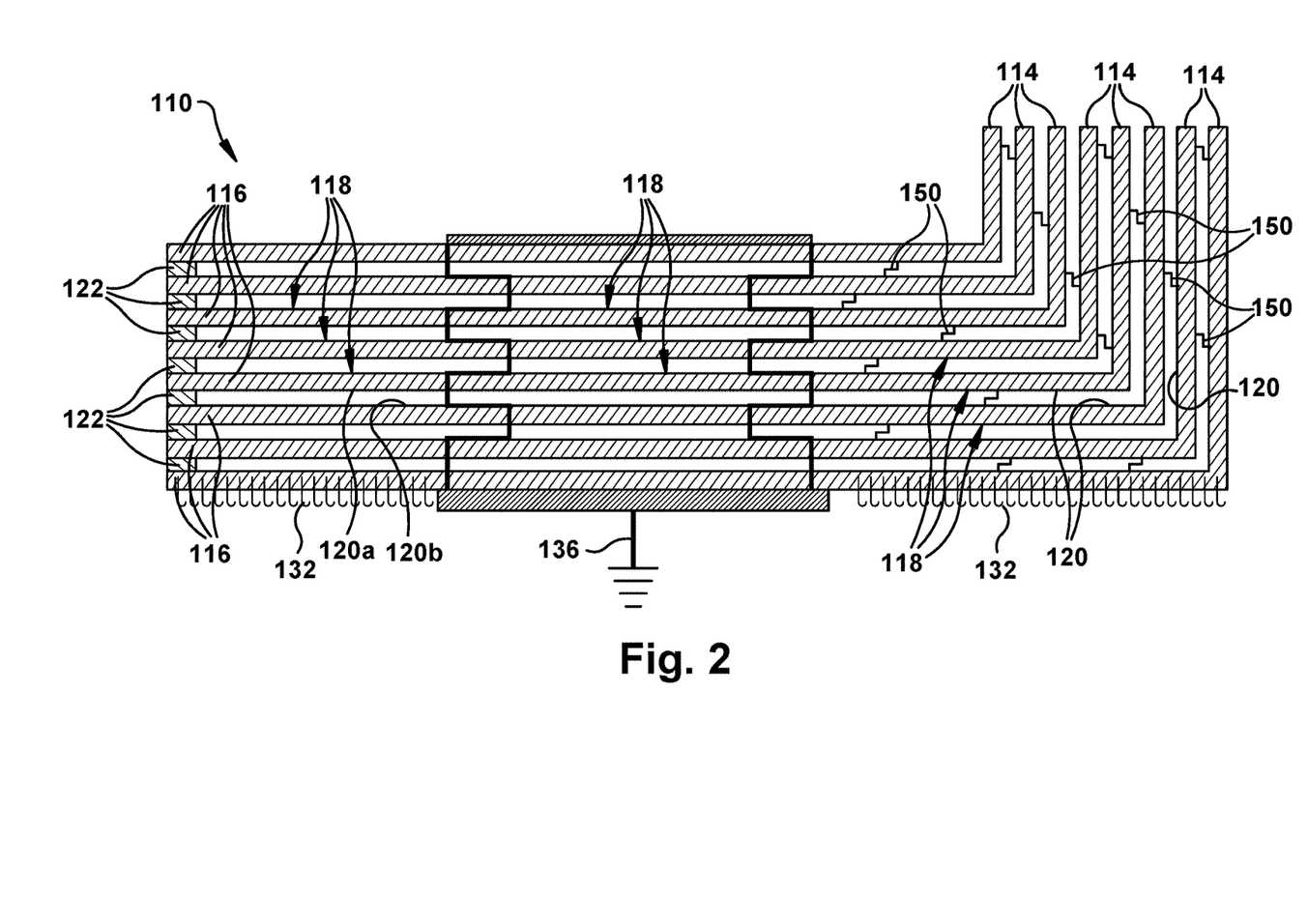
FIG. 2 is a cross-sectional side view of another exemplary three-dimensional multi-shell insulation according to an embodiment of the present disclosure.

Turning now to FIG. 2, another exemplary embodiment of a three-dimensional multi-shell insulation 110 (also referred to as "insulation" or "3DMSI") is shown. The insulation 110 may be configured essentially as a unitary structure that may be formed via additive manufacturing with one or more integrated edge bindings 122 and/or one or more integrated restraints 150. The insulation 110 shares similarities with the above-described insulation 10, and consequently the same reference numerals but indexed by 100 are used to denote structures corresponding to similar structures in the insulations. In addition, the foregoing description of the insulation 10 is equally applicable to the insulation 110, and thus aspects of the insulations 10, 110 may be substituted for one another or used in conjunction with one another where applicable, except as noted below.

As shown in the illustrated embodiment, the insulation 110 may have one or more bends, curves, or the like to conform to the shape of the spacecraft component to be insulated (not shown in this embodiment). The insulation 110 includes a plurality of nested shell layers 114 that progressively increase in size to at least partially surround the spacecraft component. The shell layers 114 may each have edge portions 116 on opposite sides of each shell layer 114, with layer major portions 118 extending between the respective layer edge portions 116. The layer major portions 118 may have at least one layer major surface 120 (e.g., 120a) configured to be spaced apart from an opposing layer major surface (e.g., 120b) of an adjacent shell layer for minimizing thermal conduction between the shell layers.

The insulation 110 may be configured to be sufficiently flexible to enable installation on and/or removal from the spacecraft component, such that the insulation 110 may bend or wrap to at least partially surround the spacecraft component. To facilitate installation or removal, the nested shell layers 114 may have sufficient flexibility to enable the layer edge portions 116 on opposite sides of the shell layers to be movable relative to each other. This may allow the insulation 110 to be installed and at least partially surround the spacecraft component for insulative purposes, and also may allow the insulation 110 to be removed for enhancing access to spacecraft component.

In exemplary embodiments, the layer major portions 118 of each nested shell layer 114 may be displaceable relative to each other for allowing the insulation to billow outwardly such that a natural separation forms between the layer major surfaces 120 when the insulation 110 is used in low-pressure and/or low gravity environments. To set and/or maintain the spacing between the shell layers 114, the insulation 110 may have one or more integrated edge bindings 122 that may be disposed toward one or more of the edge portions 116. In exemplary embodiments, the one or more integrated edge bindings 122 may be integral and unitary with the shell layers 114, and may be formed with the shell layers 114 via additive manufacturing. The edge bindings 122 may be formed of the same material or a different material as the shell layers 114, such as a low thermal conductivity material (e.g., having about the same or lower thermal conductivity than the shell layers 14) for enhancing insulative performance.

In exemplary embodiments, the integrated edge bindings 122 may be laterally spaced apart along the edge portions 116 of the shell layers to define at least one fluid passage, or vent, in fluid communication with one or more of the gaps between the adjacent shell layers 14. Alternatively or additionally, the edge bindings 122 may have one or more fluid passages extending therethrough to allow ingress or egress of fluid between the shell layers 14. Optionally, at least one filter may be included in the fluid passage(s) for filtering foreign object debris.

As shown in the illustrated embodiment, the insulation 110 may have a grounding wire 136 integrated therein. In exemplary embodiments, the grounding wire 136 may be formed via additive manufacturing, optionally with a different material, at essentially the same time as the construction of the insulation 110. In other embodiments, the grounding wire 136 may be inserted into the insulation 110 after additive manufacturing. The grounding wire 136 may be formed by a conductive material, such as copper wire. To minimize the thermal conductive leaks through the grounding feature, a circuitous path may be used to lengthen the thermal conductive path while maintaining electrical conductivity.

The insulation 110 also may include one or more fasteners 132 for operatively coupling the insulation 110 to another portion of the spacecraft. For example, the fastener 132 may be a removable-type fastener, such as a hook-and-loop fastener, for example Velcro®, which may have one portion of the fastener 132 attached to the outside of the insulation 110 and the other portion attached to the other portion of the spacecraft.

As shown, the insulation 110 may include one or more restraints 150 for restricting the amount of lateral and/or transverse displacement between the shell layers 114. The restraints 150 may be unitary with the shell layers 114, and may be formed via additive manufacturing at essentially the same time as the construction of the insulation 110, optionally with the same or different material as the shell layer 114. In exemplary embodiments, the one or more restraints 150 may be substantially similar to the above-described abutments 50. For example, in exemplary embodiments, the one or more restraints may be integral with or connected to one shell layer 114, but independent from an opposing shell layer 114, in which case the restraints also may be laterally offset to engage each other when the layers have shifted. Alternatively or additionally, one or more of the restraints 150 may be connected to both of the opposing shell layers 114, as shown in the illustrated embodiment. For example, the one or more restraints 150 may be configured as a tether, such as a thin ribbon of material, that may allow for some lateral and transverse displacement of the shell layers 114. Preferably, the one or more restraints 150 minimize contact and/or thermal conductivity between layers. For example, as shown in the illustrated embodiment, the restrains 150 may be connected between adjacent shell layers 114 such that the connection points are laterally offset relative to each other to provide a longer thermal path (e.g., a serpentine or circuitous path), which thereby reduces thermal conduction. In addition, the spacing between shell layers 114 may be wider than the spacing in the above-referenced insulation 10 to accommodate for these longer thermal paths. Also to reduce thermal conduction, one or more of the restraints 150 may be formed from a material having lower conductivity than the shell layers 114, as discussed above with reference to the insulation 10.

In exemplary embodiments, the monolithic insulation 110 may be additively manufactured to facilitate conformance to the shape of the spacecraft component, and the integrated features may provide faster turnaround times and reduce labor costs. It is understood that any suitable additive manufacturing technique may be employed to form the insulation 110 according to well-known methods understood by those having skill in the art, such as those additive manufacturing methods described above.

In exemplary embodiments, the additive manufacturing technique may include continuous liquid interface production (CLIP). The CLIP process may begin with a pool of liquid photopolymer resin. The bottom panel of the pool enclosure may be transparent to ultraviolet light (e.g., a "window"), and an ultraviolet light beam may pass through the window, illuminating the precise cross-section of the object to be formed. The UV light causes the resin to solidify, and the object rises slowly enough to allow resin to flow under and maintain contact with the bottom of solidified-resin to build the object layer by layer. An oxygen-permeable membrane lies below the resin, which creates a "dead zone" (persistent liquid interface) preventing the resin from attaching to the window. One benefit of the CLIP process is that supporting material or form may not be required for overhangs or complex shapes.

In alternative embodiments, the additive manufacturing technique may include jetted material which is cured by UV light. The polyjet process may begin with a build platform, and a three-dimensional printer jets and instantly UV-cures tiny droplets of liquid photopolymer. Fine layers accumulate on the build platform to create the desired object. Where overhangs or complex shapes require support, the three-dimensional printer jets a removable support material, which may be removed by water or solution in a bath. Typically, no post-curing is needed.

In accordance with such additive manufacturing methods, an exemplary process for forming the insulation 110 may include: i) determining the spacecraft component to be insulated, ii) mapping the configuration and/or shape of the spacecraft component into three-dimensional coordinate space, iii) based upon the three-dimensional mapping, providing a three-dimensional model of the insulation 110, including each shell layer 114, and integrated structures, such as the integrated edge bindings 122 and/or integrated restraints 150; and iv) based upon the three-dimensional model, additively manufacturing the insulation 110, including one or more of the integrated features.

After the insulation 110 has been additively manufactured, the shell layers 114 may be metallized, such as with an aluminum, nickel, gold, or other suitable metal plating for reducing emissivity, as described above. An exemplary coating technique may include electroless plating, in which the insulation 110 is submerged in the plating bath and the plating solution flows through the gaps between the shell layers. In this manner, the edge binding(s) 122 may be configured to space the layer major surfaces 122 of adjacent shell layers by a sufficient amount and/or provide sufficiently large fluid passages to allow the electroless plating solution to flow between shell layers. Alternatively or additionally, atomic layer deposition may be utilized to coat low emissivity layers. Before the metallization step, if the additive manufacturing process utilized removable support material, these supports may be dissolved or removed. Thereafter, the fastening mechanism 132 or other features, such as the grounding wire 136, may be attached or integrated therein.

A three-dimensional multi-shell insulation has been described herein. The insulation may be configured to conform to the shape of a spacecraft component to be insulated. The insulation may have a plurality of nested shell layers can float relative to each other for providing natural separation between the shell layers when the insulation is used in low-pressure, low-gravity space-related applications. To maintain the spacing between shell layers, at least one edge clamp may be operatively coupled to an edge portion on at least one side of each shell layer. The shell layers may have sufficient flexibility and/or may be sufficiently displaceable relative to each other to allow the insulation to be installed or removed from the spacecraft component. One or more restraints may be provided in the space between the shell layers for restricting the relative lateral and/or transverse movement between shell layers for preventing contact. Additive manufacturing may be employed to fabricate the insulation and integrate features.

As used herein, an "operable connection," or "operable coupling," is one in which the entities are connected in such a way that the entities may perform as intended. An operable connection may be a direct connection or an indirect connection in which an intermediate entity or entities cooperate or otherwise are part of the connection or are in between the operably connected entities.

It is to be understood that terms such as "top," "bottom," "upper," "lower," "left," "right," "front," "rear," "forward," "rearward," and the like as used herein may refer to an arbitrary frame of reference, rather than to the ordinary gravitational frame of reference.

It is to be understood that all ranges and ratio limits disclosed in the specification and claims may be combined in any manner. It is to be understood that unless specifically stated otherwise, references to "a," "an," and/or "the" may include one or more than one, and that reference to an item in the singular may also include the item in the plural.

The term "about" as used herein refers to any value which lies within the range defined by a variation of up to ±10% of the stated value, for example, ±10%, ±9%, ±8%, ±7%, ±6%, ±5%, ±4%, ±3%, ±2%, ±1%, ±0.01% of the stated value, as well as values intervening such stated values.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," may refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The transitional words or phrases, such as "comprising," "including," "carrying," "having," "containing," "involving," "holding," and the like, are to be understood to be open-ended, i.e., to mean including but not limited to.

Although the present disclosure has shown and described a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments according to the present disclosure. In addition, while a particular feature according to the present disclosure may have been described above with respect to only one or more of several illustrated embodiments, such feature may be combined with one or more other features of the other embodiments, as may be desired and advantageous for any given or particular application.

What is claimed is:

1. A three-dimensional multi-shell insulation for insulating at least one portion of a spacecraft, the insulation comprising:
    a plurality of nested shell layers of progressively increasing size that are configured to at least partially surround the at least one portion of the spacecraft, each of the plurality of shell layers having layer edge portions on opposite sides of said each of the plurality of the shell layers, and said each of the plurality of shell layers having a layer major portion extending between the layer edge portions; and
    at least one edge clamp operatively coupled to the plurality of shell layers at the respective layer edge portions on at least one side of the shell layers;
    wherein each layer major portion has at least one layer major surface configured to be spaced apart from an opposing layer major surface of an adjacent shell layer for minimizing thermal conduction between the shell layers; and wherein the respective layer major surfaces of each of the plurality of nested shell layers are configured to be spaced apart when the insulation is in use in a low-gravity and/or low-pressure environment;
    wherein the at least one edge clamp is configured to maintain spacing between the respective layer major surfaces of the shell layers when the insulation is in use in a low-gravity and/or low-pressure environment; and
    wherein each of the layer major portions of the plurality of shell layers has at least one abutment, the respective abutments of the adjacent shell layers being configured to provide a stop when engaging each other, thereby restricting the amount of relative lateral displacement between the adjacent shell layers.

2. The three-dimensional multi-shell insulation according to claim 1, wherein the plurality of nested shell layers have sufficient flexibility to enable the layer edge portions on opposite sides of the shell layers to be movable relative to each other, such that the insulation is flexibly wrappable around the at least one portion of the spacecraft, thereby allowing the insulation to be installed and at least partially surround the at least one portion of the spacecraft for insulating the at least one portion of the spacecraft, and allowing the insulation to be removed from the at least one portion of the spacecraft for enhancing access to the at least one portion of the spacecraft.

3. The three-dimensional multi-shell insulation according to claim 1, wherein each of the layer major portions of the plurality of shell layers are displaceable relative to each other for enhancing the flexibility of the insulation.

4. The three-dimensional multi-shell insulation according to claim 1, wherein the at least one abutment of each shell layer is independent of the adjacent shell layer for enabling the respective layer major portions of the plurality of shell layers to be displaceable relative to each other, thereby enhancing the flexibility of the insulation and minimizing thermal conduction between shell layers.

5. The three-dimensional multi-shell insulation according to claim 1,
wherein the at least one abutment of each shell layer is integrally formed with the shell layer, and is made of the same material as the shell layer; or
wherein the at least one abutment of each shell layer is operatively coupled to the shell layer, and is made of a different material than the shell layer.

6. The three-dimensional multi-shell insulation according to claim 1, wherein the at least one abutment of one shell layer is laterally offset from the at least one abutment on an opposing surface of the adjacent shell layer.

7. The three-dimensional multi-shell insulation according to claim 1, wherein the at least one edge clamp includes at least two edge clamps laterally spaced apart along the at least one side of the shell layers to provide at least one passage in fluid communication with the space between at least two of the shell layers, the at least one passage enabling venting of fluid from between the at least two shell layers.

8. The three-dimensional multi-shell insulation according to claim 1, wherein the at least one edge clamp{[s]} on one or more sides of the shell layers is the only mechanism for coupling the plurality of shell layers together.

9. The three-dimensional multi-shell insulation according to claim 1, wherein the edge clamp has at least one fastener for removably attaching the insulation to at least one portion of the spacecraft.

10. The three-dimensional multi-shell insulation according to claim 1, wherein the edge clamp has a ground wire integrated therein.

11. The three-dimensional multi-shell insulation according to claim 1, wherein each of the plurality of shell layers has at least one bend for at least partially surrounding the at least one portion of the spacecraft in three-dimensions.

12. The three-dimensional multi-shell insulation according to claim 11, wherein each of the plurality of shell layers is unitary.

13. The three-dimensional multi-shell insulation according to claim 1, wherein each of the plurality of shell layers has a thickness less than 0.13 mm.

14. The three-dimensional multi-shell insulation according to claim 1, wherein each of the plurality of nested shell layers is formed by additive manufacturing such that the insulation essentially conforms to the shape of the at least one portion of the spacecraft to be insulated.

15. The three-dimensional multi-shell insulation according to claim 1, wherein each of the plurality of shell layers is made of a polymeric material.

16. The three-dimensional multi-shell insulation according to claim 1, wherein each of the plurality of shell layers is metallized with a low emissivity coating.

* * * * *